FREQUENCY DIVIDING CIRCUITS

Filed June 30, 1958 2 Sheets-Sheet 1

INVENTOR.
Jan A. Narud
BY Ralph Winter
Louis V. Shogo

INVENTOR.
BY Jan A. Narud
Ralph Winter
Louis [signature]

2,996,674

FREQUENCY DIVIDING CIRCUITS

Jan A. Narud, Concord, Mass., and Ralph Winter, Summit, N.J., assignors to the United States of America as represented by the Secretary of the Navy Filed June 30, 1958, Ser. No. 745,780
9 Claims. (Cl. 328—39)

The present invention relates generally to electronic pulse circuits and more particularly to apparatus for generating pulse wave forms whose repetition rate is a submultiple of some master frequency.

There are numerous electronic systems, such as binary computers, radar units and television, which require for their proper operation synchronized wave forms, the frequencies of which are a submultiple of a master frequency. A great variety of different circuits, commonly called "frequency dividers," have been designed for performing this frequency division. Although some of the circuits possess a high degree of precision, they are usually quite involved; for example, the well-known scale-of-two counter produces excellent frequency division but requires more components than any other similar circuit. This disadvantage becomes particularly significant for non-binary division ratios, for in these instances it is necessary to include additional feedback loops in the dividing circuit.

In a number of applications the requirements imposed upon the divider are not very severe and, as a consequence, use can be made of such simpler circuits as astable multivibrators and blocking oscillators. Numerous attempts have been made to increase the reliability of these simple circuits by replacing their RC timing elements with more precise networks. Some of these modified circuits work satisfactorily but, for the most part, they are quite often rather complex so that very little is gained in comparison with the scale-of-two dividers.

It is therefore a primary object of the present invention to provide a simple, yet reliable, frequency divider for use with a fixed input frequency.

Another object of the present invention is to provide a frequency dividing circuit which is caapble of generating synchronized wave forms, the frequencies of which are a submultiple of a given master frequency.

A still further object of the present invention is to provide a highly reliable frequency dividing circuit whose precision of operation is relatively independent of supply voltage variations and tube characteristic changes.

A still further object of the present invention is to provide a frequency divider which does not require the presence of any so-called "active elements" in performing its operation.

A still further object of the present invention is to provide a frequency divider for use with a fixed input frequency which employs a pulse delay line as the timing element.

A still further object of the present invention is to provide a frequency divider having a sawtooth generator as the timing component which determines the circuit's division ratio.

Other objects and many of the attendant advantages of this invention will be readily appreciated as the same becomes better understood by reference to the following detailed description when considered in connection with the accompanying drawings wherein.

Figure 1:
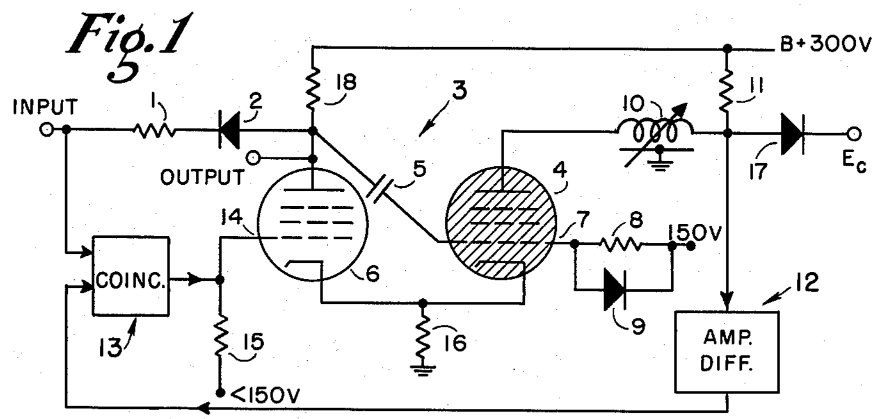
FIG. 1 is a schematic circuit, partly in block form, of a preferred embodiment of a frequency divider according to the present invention.
Figure 2:
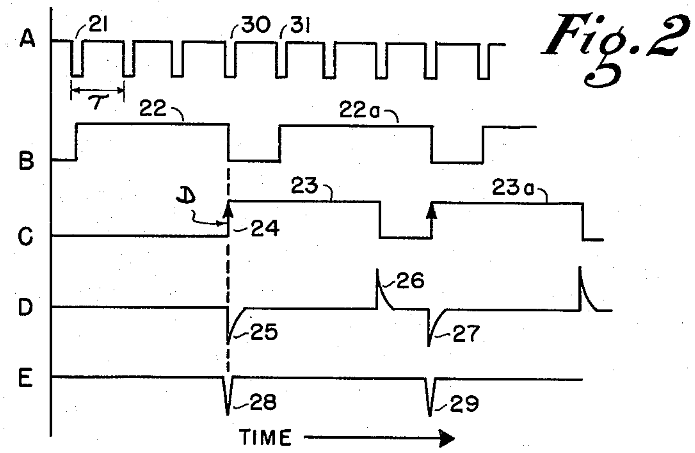
FIG. 2 depicts a series of voltage wave forms drawn to the same time scale, which is helpful in explaining the operation of the circuit shown in FIG. 1.

Referring now to the drawings, and particularly to FIG. 1, a train of negative input pulses having a fixed interpulse spacing $\tau$, better shown in line A of FIG. 2, is applied via resistor 1, diode 2 and coupling capacitor 5 to the control grid 7 of the normally "on" tube 4 of an astable multivibrator 3. This multivibrator is normally maintained in its stable position with pentode 4 conducting and pentode 6 nonconducting because of the preferential bias applied to the control grid of the former tube.

Series diode 2 is conditioned to pass negative input pulses only when pentode 6 is nonconducting. Thus, the first negative pulse of the pulse train, pulse 21 in line A of FIG. 2, passes to the output circuit and also to the control grid of the normally "on" tube and multivibrator 3 is triggered to its semi-stable position with pentode 4 now nonconducting and pentode 6 conducting. As a consequence of this transformation, a positive going pulse, wave form 22 in line B of FIG. 2, forms at the input of delay line 10 connected in the anode circuit of pentode 4. At a given time later, $T=D$, where D represents the total delay time of the line, this pulse reappears at the other end of the line, wave form 23 in line C, and proceeds to one input of a coincidence circuit 13 after passing through an amplifying and differentiating circuit 12. The negative spiked pulse 25 in line D of FIG. 2 delineates the leading edge 24 of wave form 23 after it has been subjected to a phase inversion in the amplifying portion of circuit 12 and then differentiated. The other input to the coincidence circuit 13 is the negative input pulse train.

As best shown by FIG. 2, coincidence occurs in circuit 13 only when the time delay of delay line 10 equals an integral multiple of the interpulse spacing, that is, when $D=n\cdot\tau$, $n$ being any whole integer. In the particular case selected for illustration, the delay time is in the order of three times the interpulse spacing. Consequently, the fourth pulse in the input train, namely, pulse 30 in line A of FIG. 2, coincides with the negative spiked pulse 25, and circuit 13 is activated at this time to produce a negative pulse 28 in its output circuit. This negative pulse is supplied to the control grid 14 of pentode 6, which is now conducting, and restores multivibrator 3 to its stable position. With pentode 6 now in a nonconducting status, series diode 2 is once more conditioned to pass the next negative pulse.

A new cycle of operation commences with the arrival of this negative pulse, pulse 31 in line A, at the control grid 7 of the normally "on" tube 4 and at the output terminal. The process described above repeats itself and the circuit, working as a divider, generates a negative output signal for every $n+1$ pulses in the input pulse train, $n$, as mentioned above, being equal to the number of interpulse spacings occurring within time D, the time delay of delay line 10.

It will be appreciated that if D is not equal to $n\cdot\tau$, then multivibrator 3 will run free with a cycle length determined solely by its conventional RC time constants. Also, for proper operation the multivibrator's time constant must be considerably larger than the time delay of delay line 10. Thus, whenever multivibrator 3 is triggered to its semi-stable position, it remains in this position for a length of time long enough to allow one of the negative spiked pulses 25, produced by the differentiating circuit 12, to reach the coincidence circuit.

Synchronization, or locking in, will occur within a certain delay interval, $D=n\cdot\tau\pm\epsilon/2$, where $\epsilon$, the width of the negative input pulses is necessarily smaller than $\tau$. The pulse for the coincidence gate that is obtained by amplification and differentiation of the delayed signal at the plate of the normally "on" tube of the multivibrator must have a rise time interval, $T_R$, that falls within certain limits in order to avoid ambiguities in the coincidence circuit. By employing diode 17 to clip the delayed signal at a 50% level and eliminate ringing caused by delay line 10, and then amplifying the clipped signal in a saturable type of ampifier, this rise time is greatly decreased. The precision of the timing circuit is not significantly increased by this process since amplitude variations of the delayed signal will express themselves as time-jitter of the shaped output pulse. The differentiated fast-rise-time pulse, however, is an adequate input trigger for the coincidence circuit. Experiments show that values of $T_R/\tau$ between 0.7 and 0.9 are satisfactory and that very little is gained by going below these values. Also, since a short rise time characteristic is the only requirement imposed upon the delay line, a simple lumped circuit line is very satisfactory. The rise time characteristic for such a delay line, of course, depends upon the number of sections used to obtain a certain delay, $D_L$.

Figure 3:
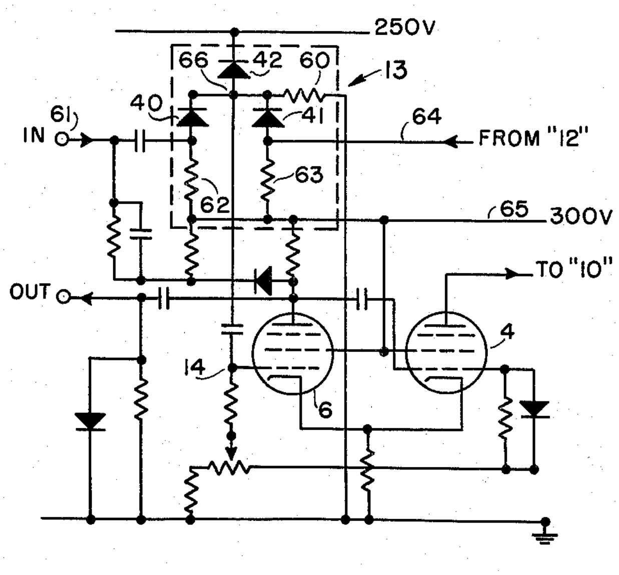
FIG. 3 is a circuit diagram of a portion of FIG. 1 showing in detail the construction of the coincidence circuit used in the above frequency divider.

Referring now to FIG. 3, the operation of coincidence circuit 13 will now be discussed in detail. Normally, that is, with no negative input pulse present at either input terminal 61 or line 64, diodes 40, 41 and 42 are all in a conducting state because of the favorable potential conditions across these components due to the high voltage source coupled to line 65. Now, if a negative pulse appears only at input terminal 61, this pulse blocks diode 40 but it has no effect on the other two diodes, diodes 41 and 42, and they remain conducting. Thus, the potential at point 66 remains substantially constant due to the uninterrupted current flow through the two conducting diodes, and no change in the voltage level is observed at the control grid 14 of pentode 6, the normally "off" tube of the multivibrator now in a conducting condition. Likewise, if a negative pulse occurs only in line 64, diode 41 is cut off and the other two diodes 40 and 42 remain conducting and, hence, the potential at point 66 stays the same. However, if negative pulses appear simultaneously at terminal 61 in line 44, diodes 40 and 41 are concurrently blocked and the potential at point 66 moves rapidly towards ground due to the presence of resistor 60 between this point and ground. Thus, a negative going pulse appears at the control grid of pentode 6 and brings about the resetting of the multivibrator circuit.

Figure 4:
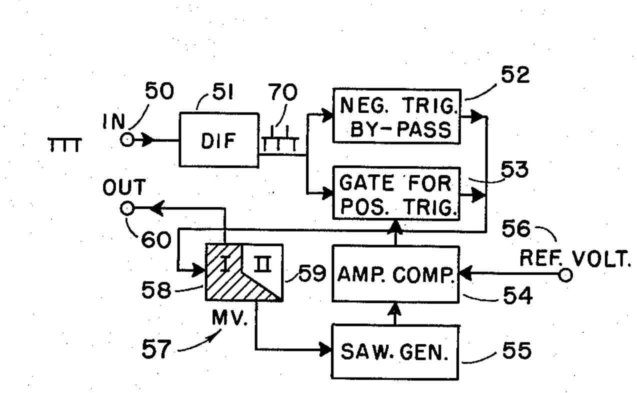
FIG. 4 is a block diagram of an alternative frequency dividing circuit.

An alternative embodiment of the present invention, which utilizes a sawtooth generator in connection with an amplitude comparator as the timing mechanism, is schematically illustrated in FIG. 4. In this arrangement the input train of negative pulses appearing at terminal 50 is applied to an RC differentiating circuit 51 and transformed into a composite pulse train made up of alternate negative and positive trigger pulses, with each of these pulses corresponding to the leading and trailing edges respectively of each negative pulse in the original train. While the negative trigger pulses reach the control grid of the normally "on" tube 58 of a conventional monostable multivibrator 57 via a polarity selective bypass circuit 52, the positive trigger pulses to the same control grid are suppressed during a certain time interval T by means of a gate 53 controlled by an amplitude comparator 54. This comparator operates between a reference voltage 56 and a sawtooth voltage produced by a bootstrap sweep circuit which is triggered whenever multivibrator 57 is flipped from its stable to its semi-stable condition.

It will thus be seen that a first negative pulse in the composite pulse train gives rise to the application of a linearly increasing voltage wave to one input of the amplitude comparator 54. As long as the amplitude of this voltage is less than the reference voltage, gate 53 remains blocked and none of the subsequent positive pulses in the composite pulse train is able to reach multivibrator 57. Since the negative pulses are continuously passed via the bypass circuit 52 to the control grid of tube 58, which is now blocked, the multivibrator circuit continues in its semi-stable condition.

However, as soon as the sawtooth voltage wave reaches the level of the reference voltage, gate 53 becomes conditioned and, consequently, the next positive pulse passes through this gate to the control grid of tube 58 and restores the multivibrator to its original stable condition. The restoration of the multivibrator brings about the termination of the sawtooth voltage wave and the return of gate 53 to its standby blocked condition. The circuit is now ready for the next cycle of operation which commences when the following negative trigger pulse flips the multivibrator once more back to its semi-stable condition. It will be appreciated from the foregoing that the division ratio $m$ of this frequency divider depends essentially upon the number of positive pulses $n$ which are suppressed by gate 53 and that for every $n+1$ negative input pulses one negative output pulse is produced.

Figure 5:
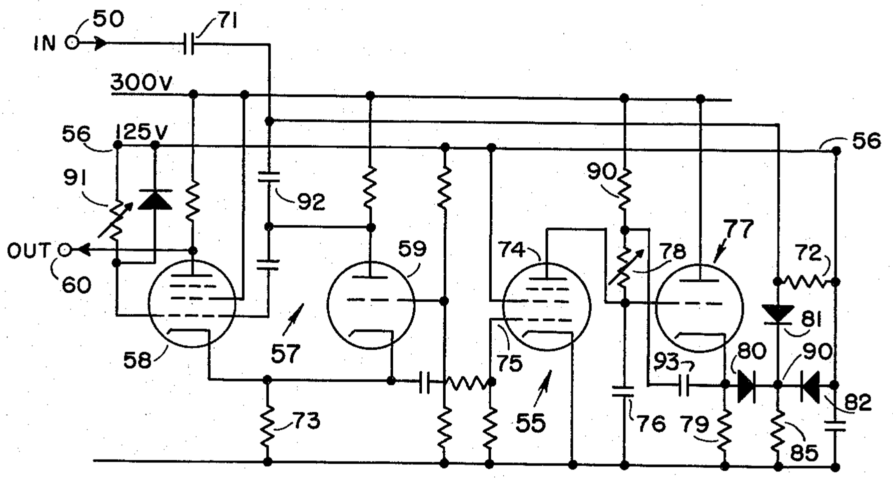
FIG. 5 is a circuit diagram illustrating the structural composition of the various circuits employed in the latter figure.

The structural details of a pulse dividing circuit, designed according to the box diagram of FIG. 4, is present in FIG. 5. In order to explain the operation of this circuit, it will be assumed that at time $T=0$ a negative trigger pulse produced by the differentiating circuit formed by capacitor 71 and series resistor 72 and representing the leading edge of the first negative pulse in the input pulse train at terminal 50 appears at the control grid of the normally "on" tube 58 of multivibrator 57, flipping this circuit from its stable to its semi-stable condition. This transformation results in the production across common cathode resistor 73 of a pulse similar in shape but of opposite polarity to the signal at output terminal 60.

This negative pulse cuts off pentode 74 of the sawtooth generator 55 portion of the bootstrap sweep circuit and allows storage capacitor 76 to charge towards the B+ level via series resistors 90 and 78. The rising voltage across this storage capacitor is coupled through a cathode follower tube 77 and capacitor 93 to the high voltage end of the load resistor 78. Consequently, when pentode 74 is cut off, both ends of resistor 78 rise in voltage by nearly the same amount and the voltage across this resistor remains essentially constant. As a result, the current through this resistor, which is the charging current of storage capacitor 76, is very nearly constant throughout the sweep interval and more linear voltage is developed across the cathode resistor 78. Thus, in response to the triggering of multivibrator 57, the voltage across cathode resistor 79 starts to rise from its normal quiescent value, which is much less than the magnitude of reference voltage 56, and the timing operation commences.

It will be recognized that with the voltage across cathode resistor 79 less than the reference voltage 56, diode 80 is held nonconducting and diode 82 conducting. As long as this condition remains, the positive trigger pulses are suppressed due to the clamping action of the conducting diodes 81 and 82 and only the negative trigger pulses for which diode 81 is nonconducting reach the control grid of the multivibrator via coupling capacitor 92. To keep diode 82 conducting, even when one of these positive trigger pulses flows through diode 81, it is necessary to select the magnitude of resistor 85 such that the voltage across this resistor does not exceed the reference voltage 56 when the additional current due to the positive trigger pulse flows therethrough.

When the sawtooth voltage wave across cathode resistor 79 equals the reference voltage, diode 80 becomes conducting and diodes 82 and 81 become nonconducting. Consequently, the next positive trigger pulse is not suppressed by the last-mentioned diodes and appears at the control grid 58 to flip multivibrator 57 back to its original stable condition, the restoration of the multivibrator forming the leading edge of the first negative output pulse. The positive pulse simultaneously formed across cathode resistor 73 renders pentode 74 conducting and establishes a discharge path for storage capacitor 76. The voltage across cathode resistor 79 of bootstrap circuit 77 is thus returned to its quiescent value and diodes 81 and 82 are restored to their standby conducting condition so as to suppress the next sequence of positive trigger pulses.

The following negative trigger pulse institutes a second cycle of operation and defines the trailing edge of the above output pulse. This process repeats itself so that the circuit continues to generate at terminal 60 one negative output pulse for every $n+1$ negative input pulses.

Due to incomplete clamping of diodes 81 and 82, there is a tendency for a relatively small positive pulse to appear prematurely at the input to the multivibrator 57. This spurious pulse can be eliminated by varying the amplitude of the reference voltage or by changing the slope of the sawtooth voltage wave generated by circuit 55. Also, in order to suppress the $(n-1)$ positive trigger pulse completely and to pass the $n$th pulse undiminished, the voltage increase $\Delta e$ of the sawtooth voltage wave during the interval between successive negative pulses in the input pulse train $\tau$ should be made larger than the magnitude of an unclamped positive trigger. The discrimination ratio between successive trigger pulses increases with the slope $$\frac{\Delta e}{\tau}$$

of the sawtooth voltage wave and it has been found that the optimum discrimination is limited by the maximum sawtooth amplitude obtained without distortion in normal vacuum tubes.

To establish the correct division ratio of the above circuit, the positive trigger suppression time should first be set by varying the magnitude of resistor 78 in series with the storage capacitor 76 of the sawtooth generator. After this, the time constant of the multivibrator 57 can be varied by means of resistor 91 until the divider locks in with the proper division ratio.

The main disadvantage of the sawtooth dividing circuit is that it uses an active element to generate the timing sawtooth wave form which, to a certain extent, make the timing process become sensitive to supply voltage variations and tube characteristic changes, whereas the delay line divider is only affected when the supply voltage is varied to an extent which makes proper operation of the multivibrator and of the associated gates and amplifiers impossible.

In comparing the two dividers it is found that the delay-line divider is more reliable and much simpler in servicing and in adjustment than the other circuit. Also, the upper frequency limit of the delay line divider is about 10 mc./s. and can be further increased if the conventional pentodes are replaced by secondary emission tubes. A low frequency limit arises only because of the bulkiness of the required delay lines.

The sawtooth divider, which is restricted to frequencies below 100 kc. can be used successfully at very low frequencies where the delay line divider would become rather uneconomical.

Obviously many modifications and variations of the present invention are possible in the light of the above teachings. It is therefore to be understood that within the scope of the appended claims the invention may be practiced otherwise than as specifically described.

We claim:

1. A pulse divider comprising, in combination, a source of negative pulses of a fixed frequency, an astable multivibrator having a normally "on" multi-electrode tube and a normally "off" multi-electrode tube as components thereof, means for coupling said negative pulses to the control grid of said normally "on" tube and to an output circuit via a switching device, said switching device being controlled by said multivibrator so as to pass negative pulses only when said multivibrator is in its stable condition whereby a first negative pulse from said source passes to said output circuit and simultaneously flips said multivibrator to its semi-stable condition thereby producing a positive pulse at the anode of said normally "on" tube, means for generating a negative spiked pulse a fixed time after the occurrence of the leading edge of said positive pulse and means for restoring said multivibrator to its stable condition whenever said negative spiked pulse coincides in time with a subsequent negative pulse from said source whereby said subsequent pulse passes through said switching device to said output circuit and to the control grid of said normally "on" tube to start a second cycle of operation.

2. A pulse divider comprising, in combination, a series of negative pulses of a fixed frequency, an astable multivibrator having a normally "on" multi-electrode tube and a normally "off" multi-electrode tube as components thereof, means for coupling said negative pulses to the control grid of said normally "on" tube and to an output circuit via a diode poled to pass negative pulses and biased by said multivibrator so as to pass these negative pulses only when said multivibrator is in its stable condition, whereby a first negative pulse from said source passes to said output circuit and simultaneously flips said multivibrator to its semi-stable condition thereby forming a positive pulse at the anode of said normally "on" tube, means for producing a negative spiked pulse a predetermined number of periods of said fixed frequency after the occurrence of the leading edge of said positive pulse and means for restoring said multivibrator to its stable condition when said negative spiked pulse occurs in time coincidence with a subsequent negative pulse from said source, the restoration of said multivibrator permitting said subsequent negative pulse to pass through said diode to said output circuit and to the control grid of said normally "on" tube.

3. A pulse divider comprising, in combination, a source of negative pulses having a fixed pulse spacing, an astable multivibrator having a normally "on" multi-electrode tube and a normally "off" multi-electrode tube as components thereof, means for coupling said negative pulses to the control grid of said normally "on" tube and to an output circuit via a diode poled to pass only negative pulses and biased by said multivibrator to pass these pulses only when said multivibrator is in its stable condition whereby a first negative pulse from said source passes to said output circuit and simultaneously flips said multivibrator to a semi-stable condition thereby forming a positive pulse at the anode of said normally "on" tube, means for generating a negative spiked pulse a predetermined number of pulse spacings after the occurrence of the leading edge of said positive pulse, means for producing a negative trigger pulse when said negative spiked pulse occurs in time coincidence with a subsequent one of said negative pulses from said source and means for coupling said trigger pulse to the control grid of said normally "off" tube to restore said multivibrator to its stable condition, the restoration of said multivibrator permitting said subsequent one of said negative pulses to reach said output circuit and the control grid of said normally "on" tube to initiate a second cycle of operation.

4. A pulse divider comprising, in combination, a source of negative input pulses having a fixed interpulse spacing, an astable multivibrator having a normally "on" multi-electrode tube and a normally "off" multi-electrode tube as components thereof, a diode, said diode having one of its sides connected to said source and the other of its sides connected to the control grid of said normally "on" tube and an output circuit, said diode being poled to pass only negative pulses and biased by said multivibrator to pass these pulses only when said multivibrator is in its stable condition, a delay line coupled to said normally "on" tube whereby a first negative pulse from said source passes through said diode to said output circuit and simultaneously flips said multivibrator to its semi-stable condition thereby producing a positive pulse at the output of said delay line at a given time later, means for inverting and differentiating said positive pulse whereby a negative spiked pulse is formed in time coincidence with the leading edge of said positive pulse and means responsive to time coincidence between said negative spiked pulse and one of said negative pulses from said source for restoring said multivibrator to its stable condition, the restoration of said multivibrator allowing said last-mentioned negative pulse from said source to pass through said diode to said output circuit and also to the control grid of said normally "on" tube of said multivibrator to institute a second cycle of operation.

5. A pulse divider comprising, in combination, a source of negative pulses having a fixed interpulse spacing, an astable multivibrator having a normally "on" multi-electrode tube and a normally "off" multi-electrode tube as components thereof, said multivibrator having a cycle length which is considerably longer than said interpulse spacing, means for coupling said negative pulses to the control grid of said normally "on" tube and to an output circuit via a diode, said diode being connected to pass only negative pulses and being biased to pass these negative pulses only when said astable multivibrator is in its stable condition whereby the first negative pulse from said source reaches said output circuit and also flips said multivibrator to its semi-stable condition to form a positive pulse at the anode of said normally "on" tube, means for delaying this positive pulse for a time equal to a given number of interpulse spacings, means for differentiating the delayed positive pulse thereby to produce a spiked pulse in time coincidence with the leading edge of said delayed positive pulse, a coincidence circuit, means for coupling said source of negative pulses to one input terminal of said coincidence circuit and means for coupling said negative spiked pulse to the other input terminal of said coincidence circuit whereby a trigger pulse is produced at the output of said coincidence circuit whenever one of said negative pulses and said spiked pulse appear simultaneously at the two input terminals, means for coupling said trigger pulse to the control grid of said normally "off" tube to restore said multivibrator to its stable condition, the restoration of said multivibrator biasing said diode to pass said one of said negative pulses to said output circuit and also to the control grid of said normally "on" tube to start a second cycle of operation.

6. A pulse dividing circuit comprising, in combination, a source of negative pulses having a fixed interpulse spacing, a multivibrator having as components thereof a normally "on" and a normally "off" multi-electrode tube, said multivibrator having a normal cycle length which is longer than said interpulse spacing, a switching device, said switching device being connected between said source of negative pulses and the control grid of said normally "on" tube, said switching device passing negative pulses only and passing these pulses when said normally "off" tube is nonconducting, a gate circuit, said gate circuit being connected between said source of negative pulses and the control grid of said normally "off" tube, said gate circuit passing negative pulses only upon the application thereto of a control pulse, means responsive to the triggering of said multivibrator by one of said negative pulses for applying at a predetermined time thereafter a control pulse to said gate circuit whereby the next negative pulse from said source resets said multivibrator and an output circuit coupled to said normally "off" tube.

7. In an arrangement as defined in claim 6 wherein said control pulse has a time duration approximately equal to that of said negative pulses and wherein said predetermined time is a multiple of said interpulse spacing.

8. A pulse dividing circuit comprising, in combination, an astable multivibrator, said multivibrator having a first input circuit for switching said multivibrator from its stable to its semi-stable condition and a second input circuit for switching said multivibrator from its semi-stable to its stable condition, a source of negative pulses having a fixed interpulse spacing, said spacing being less than the time normally required for said multivibrator to revert to its stable condition after being switched to its semi-stable condition, a diode in said first input circuit, said diode being poled to pass negative pulses and biased to pass these pulses only when said multivibrator is in its stable condition, a coincidence circuit in said second input circuit, said coincidence circuit developing a negative trigger pulse whenever both of its input circuits are simultaneously activated by negative pulses, means for coupling said source of negative pulses to one of the input circuits of said coincidence circuit, means for producing a negative pulse in the second input circuit of said coincidence circuit a predetermined time after the switching of said multivibrator from its stable to its semi-stable condition, said predetermined time being a multiple of the interpulse spacing and an output circuit coupled to said multivibrator for producing a pulse having a time duration equal to the length of time said multivibrator is in its semi-stable condition.

9. A pulse dividing circuit comprising, in combination, a source of negative pulses having a fixed interpulse spacing, an astable multivibrator having as components thereof a normally "on" and a normally "off" multi-electrode tube, said multivibrator having a reset time which is normally longer than said interpulse spacing, a diode, said diode being connected between said source of negative pulses and the control grid of said normally "on" tube, said diode being poled to pass only negative pulses and biased to pass these pulses only when said multivibrator is in its normal state, a delay line having a time delay corresponding to a number of interpulse spacings, a differentiating circuit, a gate having a pair of input circuits and an output circuit, means for connecting said delay line and said differentiating circuit in series between the anode of said normally "on" tube and one input of said gate whereby negative pulses appear in said one input circuit a given time after each triggering of said multivibrator, means for connecting said source of negative pulses to the other input of said gate, means for connecting the output of said gate to the control grid of said normally "off" tube and an output circuit connected to the anode of said normally "off" tube.

References Cited in the file of this patent

UNITED STATES PATENTS

| | | |
|---|---|---|
| 2,478,683 | Bliss | Aug. 9, 1949 |
| 2,562,295 | Chance | July 31, 1951 |
| 2,747,094 | Walker | May 22, 1956 |